United States Patent [19]

Sekizawa et al.

[11] Patent Number: 5,313,632
[45] Date of Patent: May 17, 1994

[54] METHOD FOR PROCESSING DATA IN A DISTRIBUTED PROCESSING SYSTEM

[75] Inventors: Toshihiko Sekizawa, Katsuta; Kinji Mori, Yokohama; Masayuki Orimo, Kawasaki; Yasuo Suzuki, Ebina; Katsumi Kawano, Kawasaki; Minoru Koizumi, Yokohama; Kozo Nakai, Katsuta; Hirokazu Kasashima, Hitachi, all of Japan

[73] Assignee: Hitachi, Ltd., Tokyo, Japan

[21] Appl. No.: 983,250

[22] Filed: Nov. 30, 1992

Related U.S. Application Data

[63] Continuation of Ser. No. 283,566, Dec. 13, 1988, abandoned.

[30] Foreign Application Priority Data

Dec. 18, 1987 [JP] Japan .................. 62-318823

[51] Int. Cl.5 .................. G06F 15/16; G06F 13/00
[52] U.S. Cl. .................. 395/650; 395/800; 395/200; 364/DIG. 1; 364/229.2; 364/232.22; 364/264.5; 364/281.3; 364/284.3; 364/931.43; 364/942.79
[58] Field of Search .............. 395/650, 800, 200, 325

[56] References Cited

U.S. PATENT DOCUMENTS

| | | | |
|---|---|---|---|
| 4,382,277 | 5/1983 | Glaser et al. | 364/200 |
| 4,498,082 | 2/1985 | Aldridge et al. | 340/825.16 |
| 4,532,588 | 7/1985 | Foster | 364/200 |
| 4,627,055 | 12/1986 | Mori et al. | 364/200 |
| 4,653,048 | 3/1987 | Anderson et al. | 364/200 |
| 4,794,519 | 12/1988 | Koizumi et al. | 364/200 |
| 4,847,756 | 7/1989 | Ito et al. | 364/200 |

FOREIGN PATENT DOCUMENTS

146361 9/1982 Japan .
286959 12/1986 Japan .

Primary Examiner—Eddie P. Chan
Attorney, Agent, or Firm—Antonelli, Terry, Stout & Kraus

[57] ABSTRACT

Programs in a plurality of processors connected through a common network are started when a plurality of data necessary for starting the program are received from the network. When the processor receives data from an external equipment, it adds the event number to the data and sends it to the network, and each processor determines whether all data necessary for starting the program in itself have been received and checks the relation among the received data by comparison with the event numbers of the received data.

8 Claims, 12 Drawing Sheets

START OF SAME EVENT NUMBER DATA

RELAY OF EVENT NUMBER IN I/O DATA STORAGE AREA 305

BUFFER IN PROCESSING UNIT 304

PROGRAM CONTROL TABLE 500

| | 511 | 521 | 522 | | 523 |
|---|---|---|---|---|---|
| 501 | PN | CC | CC | ———— | CC |
| 502 | | | | ———— | |
| | \| | \| | \| | | \| |
| 503 | | | | ———— | |

DATA CONTROL TABLE 550

| | 561 | 562 | 563 | 571 | | 572 |
|---|---|---|---|---|---|---|
| 551 | PN | E | F | D | ———— | D |
| 552 | | | | | ———— | |
| | \| | | | \| | | \| |
| 553 | | | | | ———— | |

| CC | DATA |
|---|---|
| 581 | 582 |

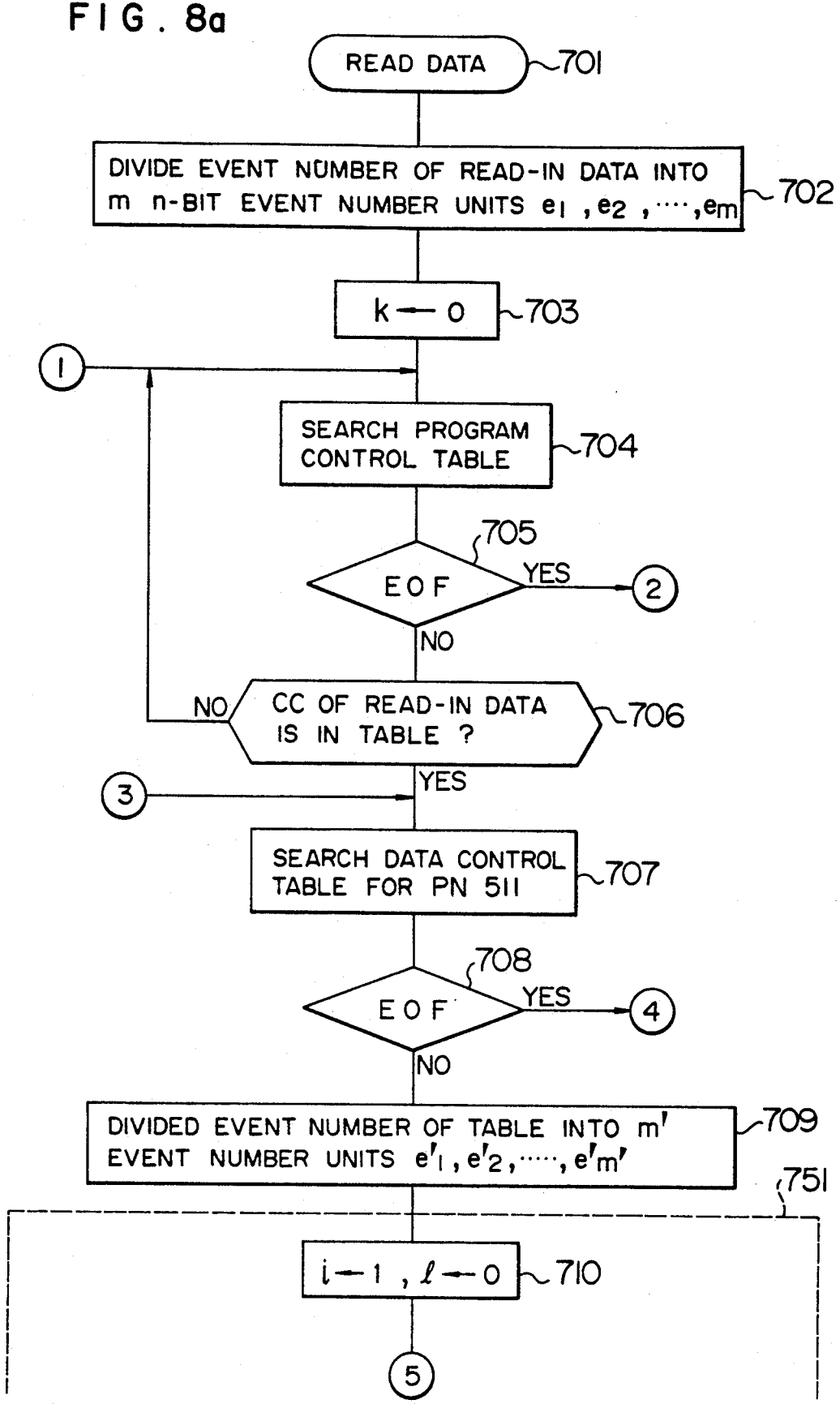

METHOD FOR PROCESSING DATA IN A DISTRIBUTED PROCESSING SYSTEM

This application is a continuation application of Ser. No. 07/283,566, filed Dec. 13, 1988, now abandoned.

CROSS-REFERENCE TO RELATED APPLICATIONS

This, application relates to U.S. application Ser. No. 07/283,911, entitled "Method for Developing Programs in a Distributed Processing System" filed by M. Orimo et al on Dec. 13, 1988 now abandoned, based on the Japanese patent applications No. 62-318822 and No. 63-60371; and U.S. application Ser. No. 035,026, entitled "Distributed Processing System and Method", filed by M. Orimo et al on Apr. 6, 1987, based on Japanese patent applications No. 61-76522 and No. 61-173642.

BACKGROUND OF THE INVENTION

The present invention relates to a method of processing data by correlating input data of a multi-data input program to enhance assurance of proper operation in a distributed processing system which has a plurality of processors.

A distributed processing system is described in U.S. Pat. No. 4,627,055.

In the prior art, such as described in JP-A-57-146361, a multi-data input program is started when all data necessary for starting the program has been received but no check is made as to whether the combination of data is valid or not. Accordingly, a problem is involved in the assurance of execution of the process.

SUMMARY OF THE INVENTION

It is an object of the present invention to provide a method of processing data in a manner to enhance assurance of proper execution of a multi-data input program in a distributed processing system.

It is another object of the present invention to provide a distributed processing method in which each of a number of processors connected to a network correlates a plurality of data applied to a single program.

The above objects are achieved by each processor which correlates a plurality of data applied to a program of its own processor by:

labeling the externally applied data and sending it to the network, labeling output data resulting from the execution of the program with a content determined by the content of the label of the input data, and comparing labels of a plurality of input data when a multi-data input program is to be stored.

Since all of the data applied to the multi-data input program is correlated in each processor, the accuate execution of the process is assured.

BRIEF DESCRIPTION OF THE DRAWINGS

FIGS. 8a to 8d and 9 show process flows in each processor.

DESCRIPTION OF THE PREFERRED EMBODIMENTS

Figure 2:
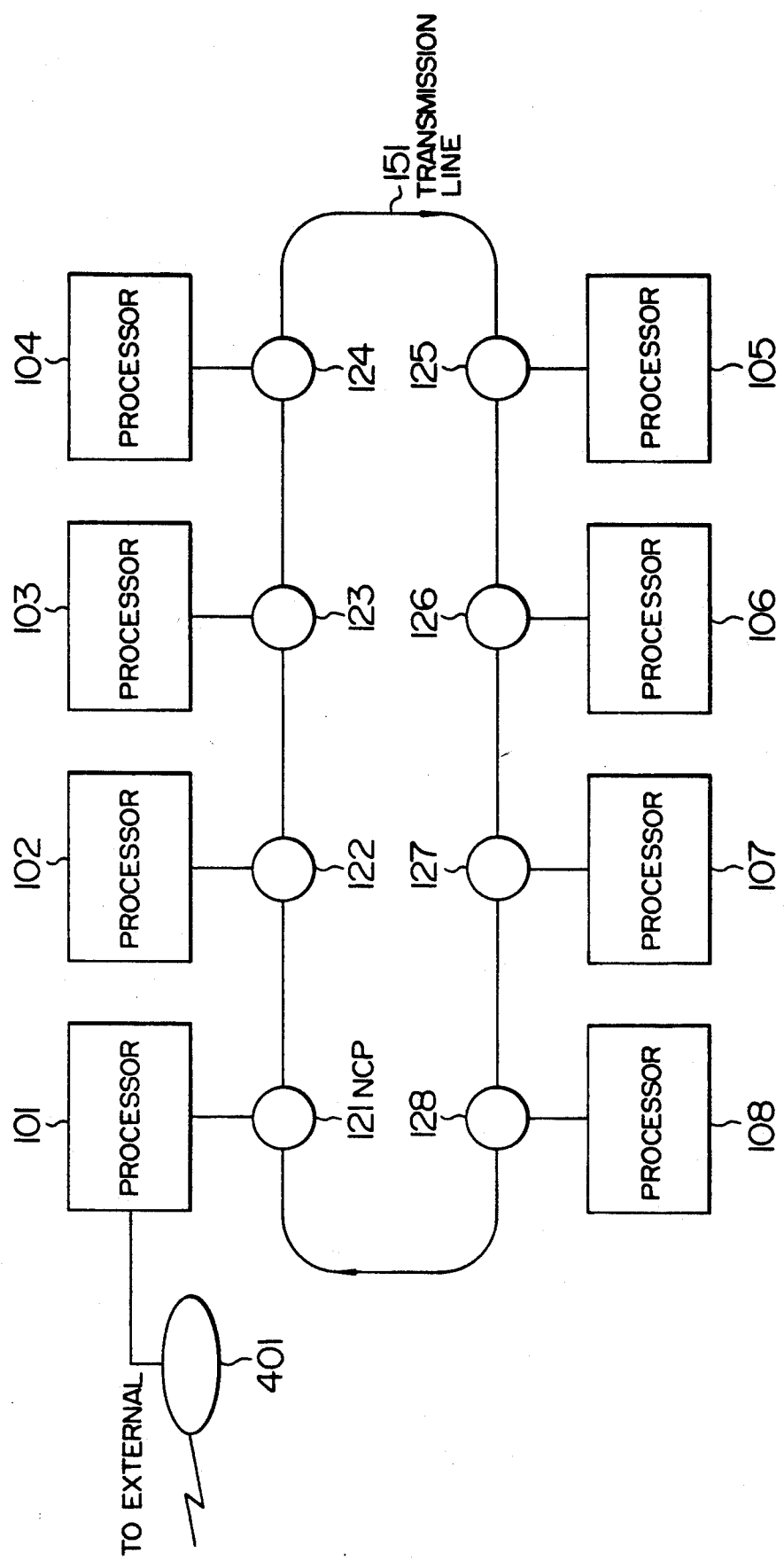
FIG. 2 shows the configuration of a system which implements the present invention.

FIG. 2 shows an overall configuration of a system to which the present invention is applied. In the embodiment, processors are connected through a single loop transmission system; although, the present invention is equally applicable to a double loop transmission system or a conventional network having a plurality of interconnected loops.

In FIG. 2, numerals 101-108 denote processors which execute application programs stored in their internal memories, numeral 151 denotes a monolateral loop transmission line, and numerals 121-128 denote network control processors (NCP's) which control transmission of data on the transmission line. The NCP's 121-128 and the processors 101-108 are bilaterally connected. Process results produced in of the processors 101-108 are broadcasted over the transmission line 151 through the NCP's 121-128. Each of the NCP's 121-128 determines whether the data broadcasted over the transmission line 151 is required by itself, and sends the required data to the processor 101-108 connected to itself. Each of the processors 101-108 starts execution of a program when all messages necessary for the execution of the application program stored therein are available. The program, when started, operates to execute a process based on the content of the above message and outputs result data. In the present embodiment, external equipment 401 for inputting and outputting data is connected to the processor 101.

Figure 3:
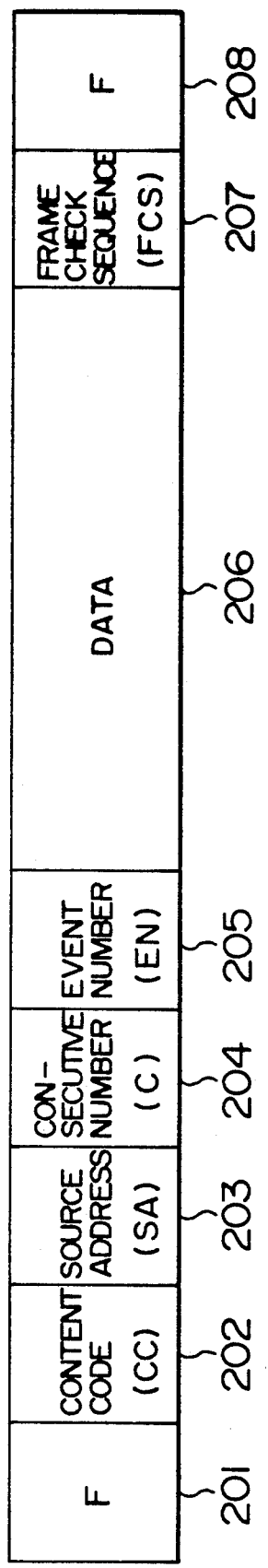
FIG. 3 shows the format of a message to be transmitted.

FIG. 3 shows a format of the message broadcasted over the transmission line, in which message F 201 and F 208 are flags indicating the beginning and end of the message. CC 202 denotes a content code which is indicative of the content and function of data in the message. Each NCP determines whether the received message is required by the processor connected to itself based on the content code (CC) 202 in a received message. The content code represents the meaning of data in the message. The content code is preferably changed when the message is transferred to a processor through the transmission line and the data is modified or processed thereby. SA 203 denotes an address of the NCP which has sent the message (source address), and C 204 is a consecutive number which is required in the transmission. E 205 denotes a label (event number) added by the processor to which data has been applied from the input equipment. It represented generation of a block of data. The event number remains unchanged even if the content code is changed by the modification processing of data by the processor. DATA 206 is the content of a processing result. FCS 207 denotes a frame check sequence for detecting error in the message, such as used in the conventional Cyclic Redundancy Check system.

Figure 4:
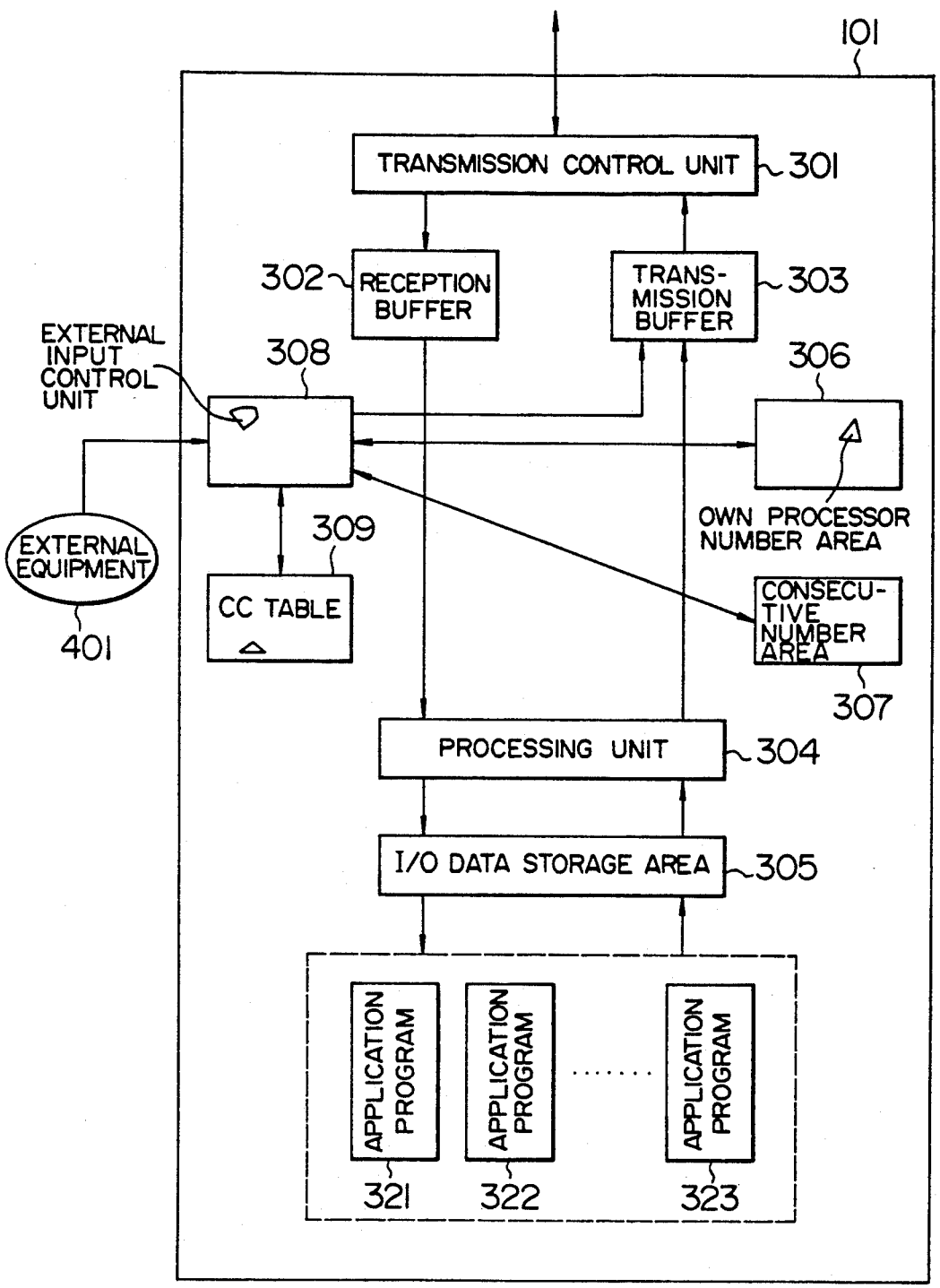
FIG. 4 shows the configuration of a processor.

FIG. 4 shows a configuration of the processor 101 shown in FIG. 2. The processors 102-108 are of the same configuration. A transmission control unit 301 controls data transmission between the processor 101 and the NCP 121 and stores the data received from the NCP 121 into a reception buffer 302. It also sends the message in a transmission buffer 303 to the NCP 121, and stores it into the reception buffer 302 if the data is required by the application program in its own processor. A processing unit 304 controls the execution of the application programs 321–323. An own processor number storage area 306 stores the number uniquely assigned to each processor. A consecutive number area 307 is used as a counter for the number of data generations. An external input control unit 308 receives an input from the external equipment 401. When the external input control unit 308 receives data from the external equipment 161, it adds to the data an n-bit event number which consists of the processor number and the consecutive number stored in the consecutive number area 307. An external input CC table 309 stores a content code of the external input data. An I/O data storage area 305 stores I/O messages for each application program.

Figure 5:
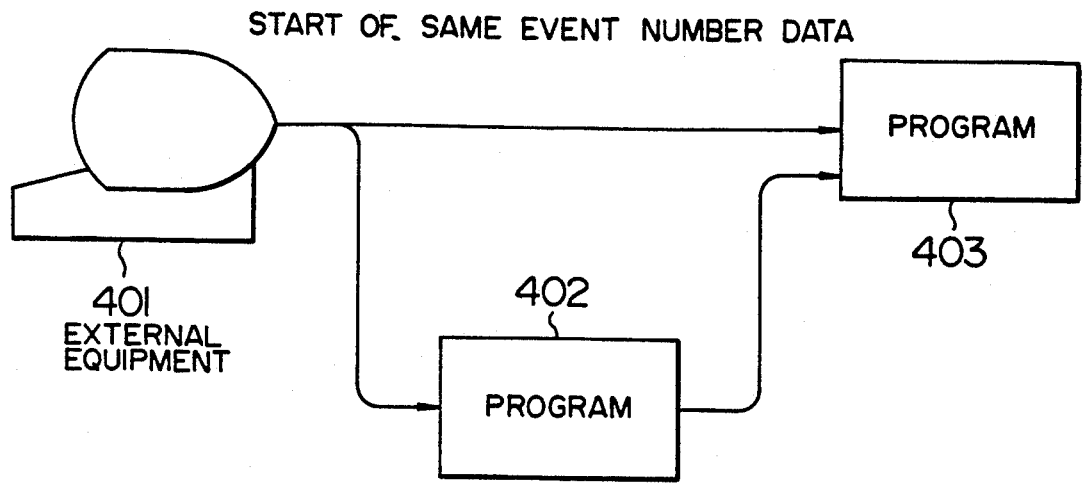
FIG. 5 shows an I/O relation between an external equipment and an application program.

A method for processing data of the multidata input program is now explained with reference to FIG. 5 et seq.

The application program may be started when all data of a plurality of content codes are available (AND start) or when any one of the data is available (OR start). In the programs of the AND start type, sources having a data of the plurality of content codes may be provided from the same external equipment 401, as is the case for the program 403 in FIG. 5. In such a case, it is necessary to correlate the input data. (The start of program in such a case is referred to as start of same event number data, and the correlation between data is referred to as consistency between data).

Figure 6:
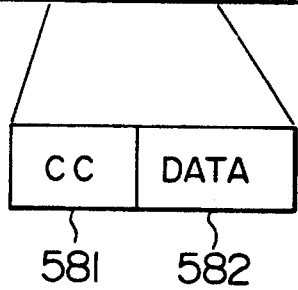
FIG. 6 shows a table required for data processing of the multi-data input program.
Figure 8B:
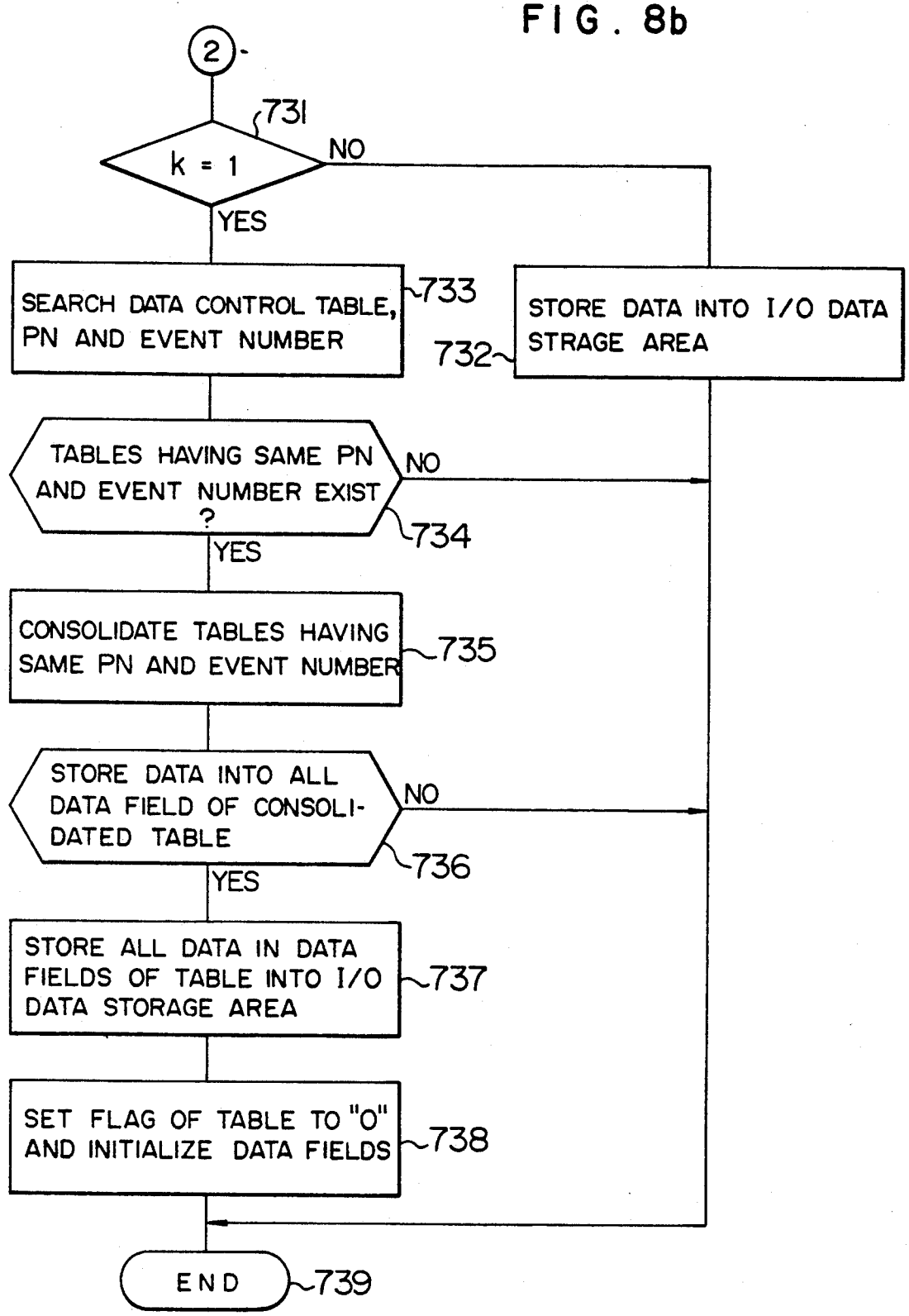
Figure 8C:
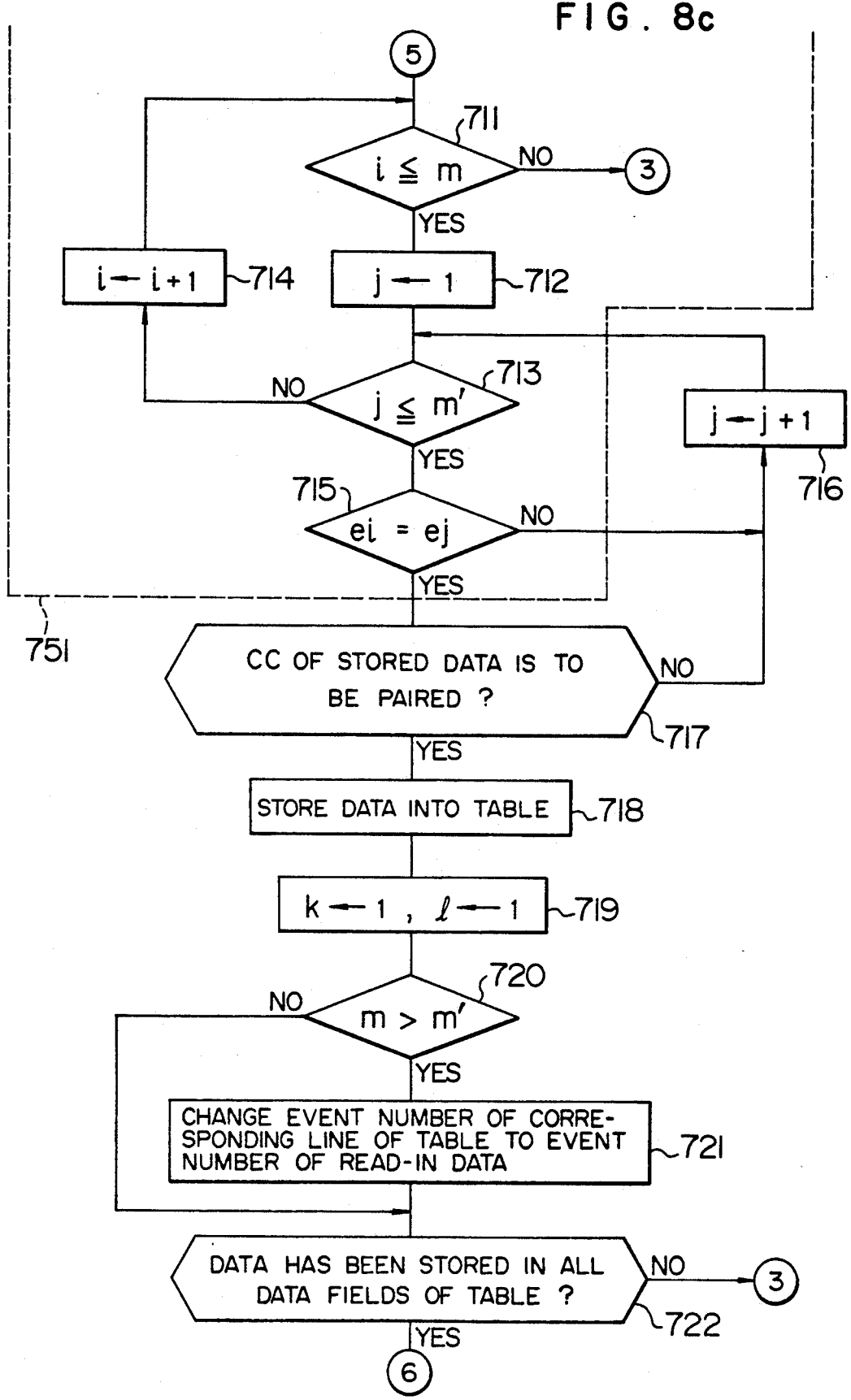
Figure 8D:
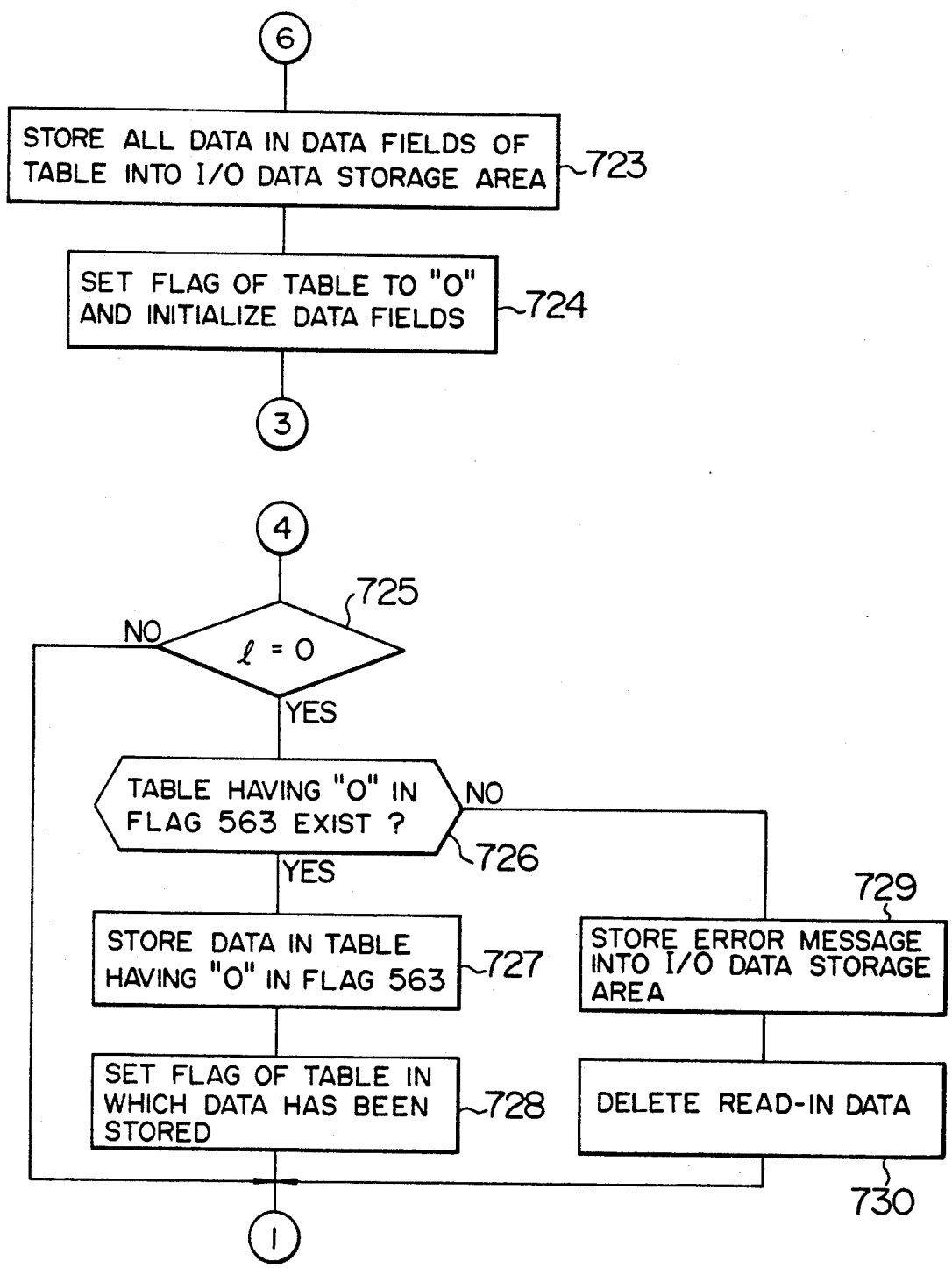

FIG. 6 shows a configuration of a buffer which stores data necessary for processing data for a program which is started with data having the same event number. Numeral 500 denotes a program control table in which programs of the start of same event number data type and the content codes of data to be correlated are registered. PN 511 denotes the program name of the start of same event number data type, and CC 521–523 denote content codes of data to be correlated for the particular program. Numeral 550 denotes a data control table. PN 561 denotes a program name of the start of same event number data type. Any number of such tables may be provided for each program. E 562 denotes an event number. D 571–572 denotes a data field which consists of the content code (CC) 581 and a data content (DATA) 582 shown at the bottom of FIG. 6. F 563 denotes a flag which is set when data is stored in the data field. For the program of the OR start type and the program of the AND start type which is not the start of same event number data type, there is no program control table 500 nor data control table 550. Accordingly, when the data for starting such program is sent from the reception buffer 302 to the processing unit 304, it is directly sent to the I/O data storage area 305.

Figure 7:
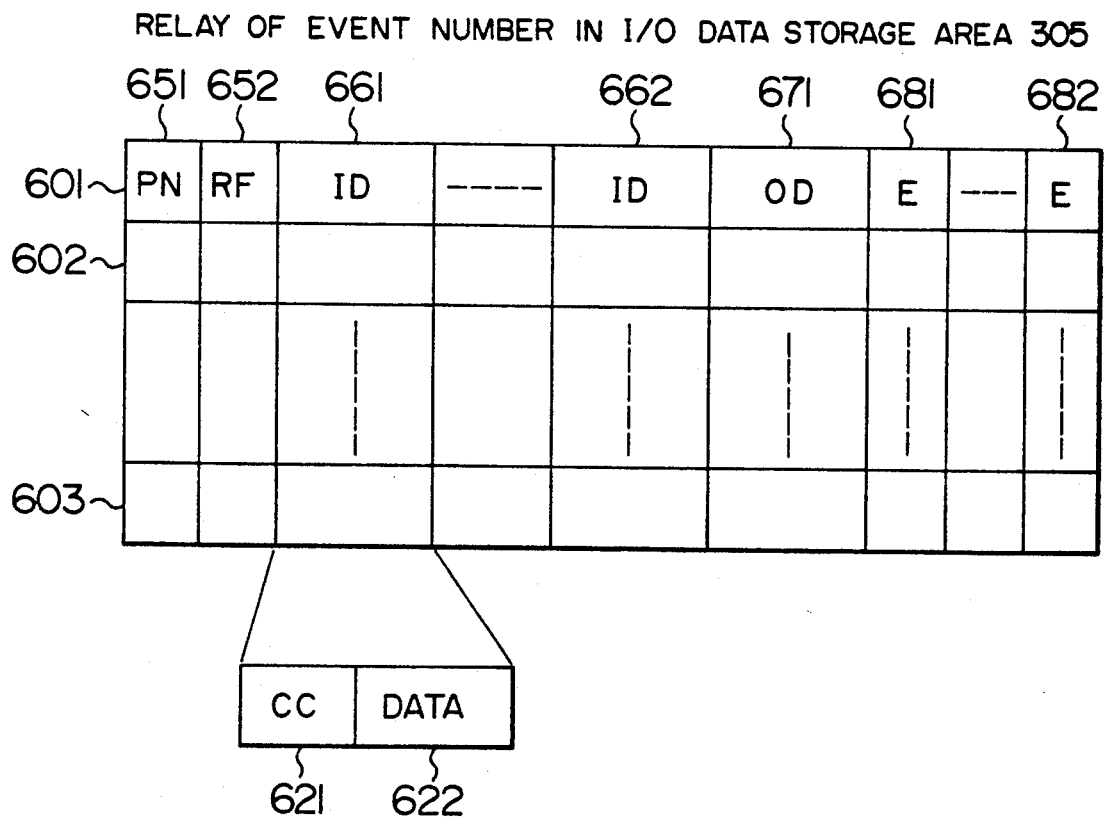
FIG. 7 shows the format of an I/O data storage area.

The relaying of the event number will be explained with reference to FIG. 7, which shows a format of a table in the I/O data storage area 305. Lines 601–603 of the table correspond to the application programs 321–323 of FIG. 4, respectively. PN 651 denotes a program name. ID 661–662 denote input data for starting the programs. It consists of a content code (CC) 621 and a data content (DATA) 622. As many ID 661–662 as the number of input data necessary to start the corresponding application program are provided. When data has been stored in all ID 661–662 in one line of the table, a run flag (RF) 652 is set and the program is started. The process result is stored in OD 671 (having the same format as that of ID). E 681–682 denote n-bit event numbers of input data. All event numbers for different input data are stored therein. When data is stored in OD 671, the data is used for the data field 206 of FIG. 3, and all event numbers stored in E 681–682 are added as a set to the event number area 205, and they are sent from the I/O data control area 305 to the transmission line through the processing unit 304 and the transmission buffer 303. Accordingly, the event number set E 205 shown in FIG. 3 has m×n bits (where m is the number of event numbers added).

Figure 9:
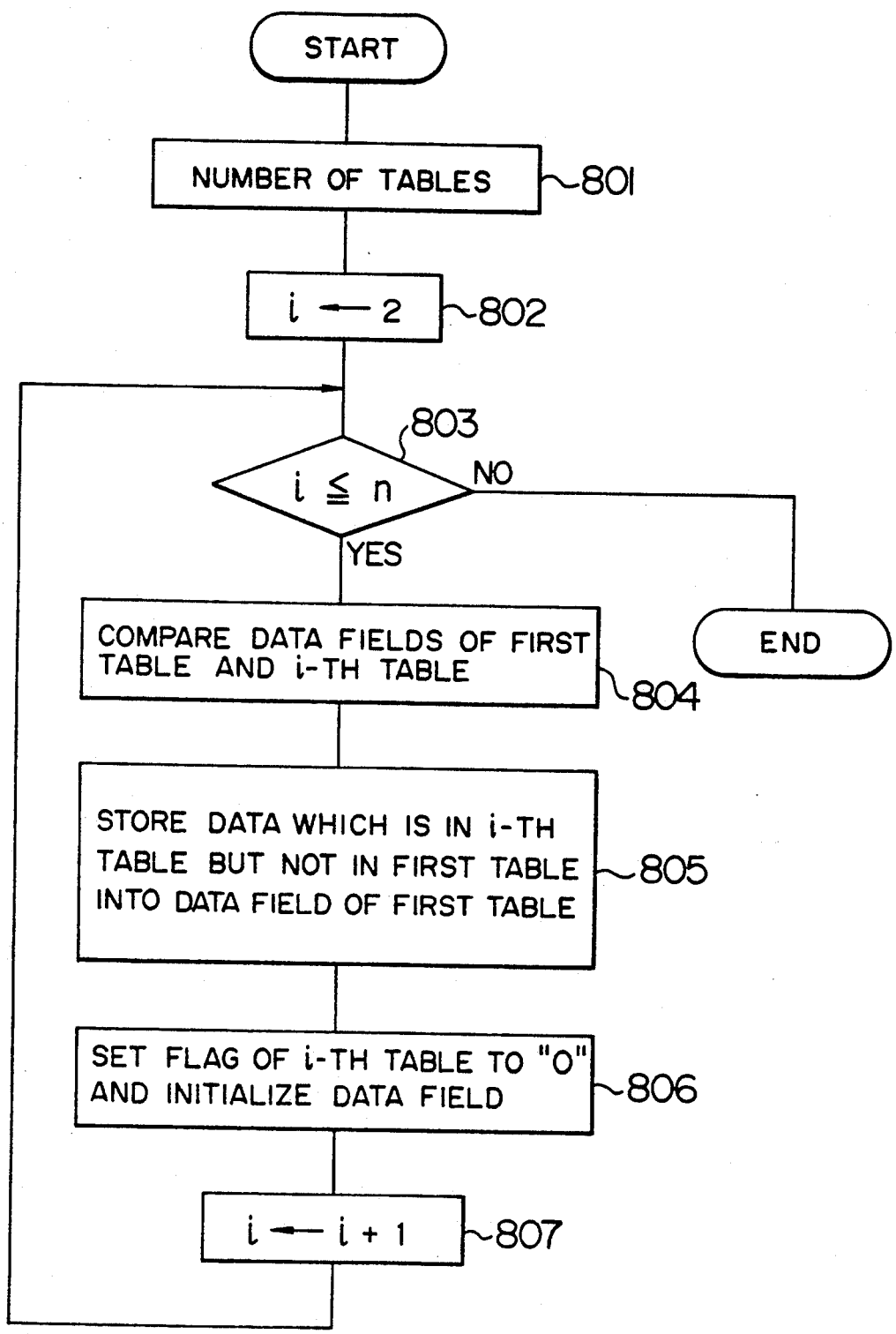

FIGS. 8a to 8d show flow charts of data processing of the program of the start of same event number data type executed by the processing unit 304 of FIG. 4. When the processing unit 304 receives data from the transmission line through the reception buffer 302 (step 701 in FIG. 8a), it divides the event number set of the data to n-bit blocks. (The value of each n-bit block is referred to as an event number unit.) It is now assumed that it is divided into m event number units $e_1, e_2, \ldots, e_m$ (step 702 in FIG. 8a). A flag k which indicates whether the data has been stored in the data control table 550 is set to "0" (step 703 in FIG. 8a). The line 501 of the program control table is first searched (step 704 in FIG. 8a). Whether the same content code as the content code (CC) 202 of the read-in data exists in the CC 521–523 registered in the line 501 is checked (step 706 in FIG. 8a), and if it does not exist, the next line 502 is searched (step 704 in FIG. 8a). If it exists in line 501, a line of the data control table 550 corresponding to PN 511 of the line 501 is searched (step 707 in FIG. 8a). It is assumed that the line 551 is retrieved. E 562 of the line 551 is divided into m' event number units $e'_1, e'_2, \ldots, e'_{m'}$ (step 709 of FIG. 8a), and the event number units $e_1, e_2, \ldots, e_m$ of the read-in data and the event number units $e'_1, e'_2, \ldots, e'_{m'}$ of the line 551 are compared to check whether there is an equal event number unit (step 751 in a broken line block of FIGS. 8a and 8c). A flag l is set when an equal event number unit is detected. If there is an equal event number unit, whether CC 581 of the data already stored in D 571–572 of the line 551 is a content code to be paired with CC 202 of the read-in data is checked based on the information of the line 501 of the program control table (step 717 in FIG. 8c). If CC 581 is not the content code to be paired with CC 202, another event number unit of the line 551 is checked (steps 716, 713 and 715 in FIG. 8c). If the content code to be paired is detected, CC 202 and DATA 206 of the read-in data are stored into an empty area of D 571–572 of the line 551 (step 718 in FIG. 8c). Then, flags k and l are set (step 719 in FIG. 8c). If the number of digits of the event number set E 205 of the read-in data is larger than the number of digits of E 562 of the line 551 (step 720 in FIG. 8c), the event number set E 562 of the line 551 is replaced by the event number set E 205 of the read-in data (step 721 in FIG. 8c). Whether data has been stored in all data fields D 571–572 of the line 551 is checked (step 722 in FIG. 8c), and if it has been stored, the data of the data fields D 571–572 of the line 551 is stored into the input data fields ID 661–662 of the I/O data storage area having the PN 651, corresponding to the PN 561 of the line 551, of the I/O data storage areas 601–603 (step 723 in FIG. 8d), and the flag F 563 of the line 551 is set to "0" and the data fields D 571–572 are initialized (step 724 in FIG. 8d). Then, whether PN 511 of the line 501 exists in other than the line 551 is checked (step 707 in FIG. 8a). If it exists, the steps 709–724 are repeated, and if it does not exist, whether l=0, that is, whether there is no matching between the event number unit of the read-in data and the event number unit of any line of data control table 550 is checked (step 725 in FIG. 8d). If l=1, the process immediately returns to the step 704 to start the search of line 502 of the program control table. If l=0, whether the flag F 563 is 0, that is, whether there is a line of the data control table in which no data has been stored in the data fields D 571-572 is checked (step 726 in FIG. 8d). If the data control table having "0" in the flag F 563 is detected, the read-in data is stored into that line (step 727 in FIG. 8d) and the flag F 563 of that line is set (step 728 in FIG. 8d). If there is no line having "0" in the flag F 563, an error message indicating failure to store data is stored into the I/O data storage area (step 729 in FIG. 8d) and the read-in data is deleted (step 730 in FIG. 8d). After those steps, the process returns to the step 704 to check whether CC 202 of the read-in data is included in CC 521-523 of the line 502 of the program control table, and the steps 705-730 are repeated. When the line 503 is retrieved and the steps 705-730 have been executed (steps 705 in FIG. 8a), whether k=1, that is, whether the read-in data has been stored in the data control table is checked (step 731 in FIG. 8b). If k=0, the read-in data is stored into the I/O data storage area 305 (step 732 in FIG. 8b), and the process in the processing unit 304 is terminated (step 739 in FIG. 8b). If k=1, the data control table 500 is searched for PN 561 and the event number E 562 (step 733 in FIG. 8b) to determine whether both PN 561 and E 562 are in the same table (step 734 in FIG. 8b). If PN 561 and E 562 are not in the same table, the process in the processing unit 304 is terminated (step 739 in FIG. 8b). If they are in the same table, PN 561 and E 562 are consolidated to one table (step 735 in FIG. 8b). A flow chart for table consolidation is shown in FIG. 9. A value n indicating the number of lines in the table to be consolidated is set (step 801), and an initial value "2" is set for i (step 802). The data fields D 571-572 of the first line and i-th line of the n lines to be consolidated are compared (step 804). The data which is in the data field of the i-th line but not in the data field of the first line is stored into the data field of the first line (step 805). For the i-th line, the flag F 563 is set to "0" and the data fields D 571-573 are initialized (step 806). Then, i is incremented (step 807), and if i≦n (step 803), the steps 804-807 are repeated. If i>n, the consolidation process is terminated. For the consolidated line, whether data has been stored in all of the data fields 571-572 is checked (step 736 of FIG. 8d). If it has not been stored, the process in the processing unit 304 is terminated (step 739 in FIG. 8d). If data has been stored in all data fields, the data is stored into the I/O data storage area (step 737 in FIG. 8d), and the flag F 563 is set to "0" for that table and all data fields D 571-572 are initialized (step 739 in FIG. 8b), and the process in the processing unit 304 is terminated.

Figure 1A:
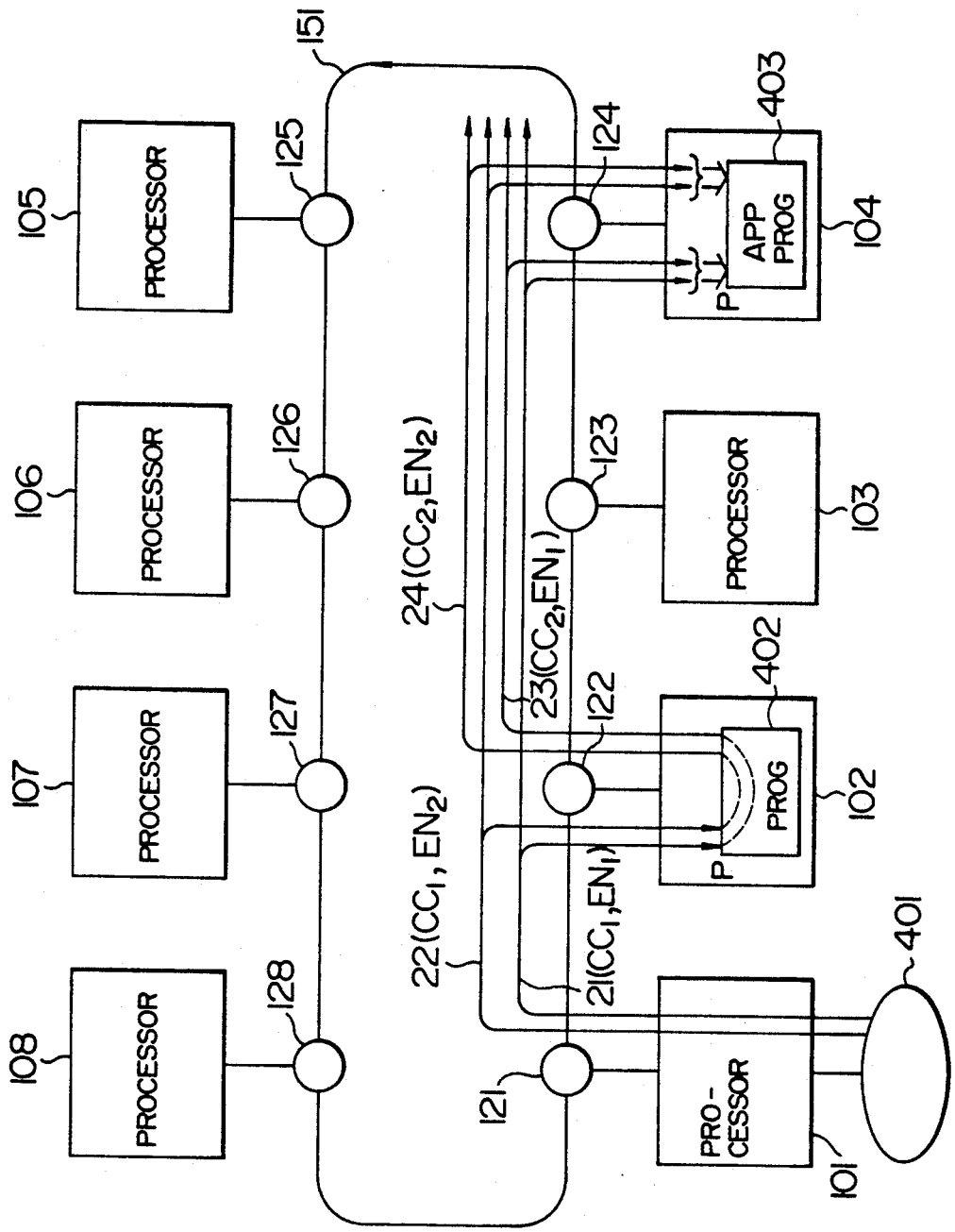
FIGS. 1a and 1b show the overall flow in a data processing method in a distributed processing system of the present invention.
Figure 1B:
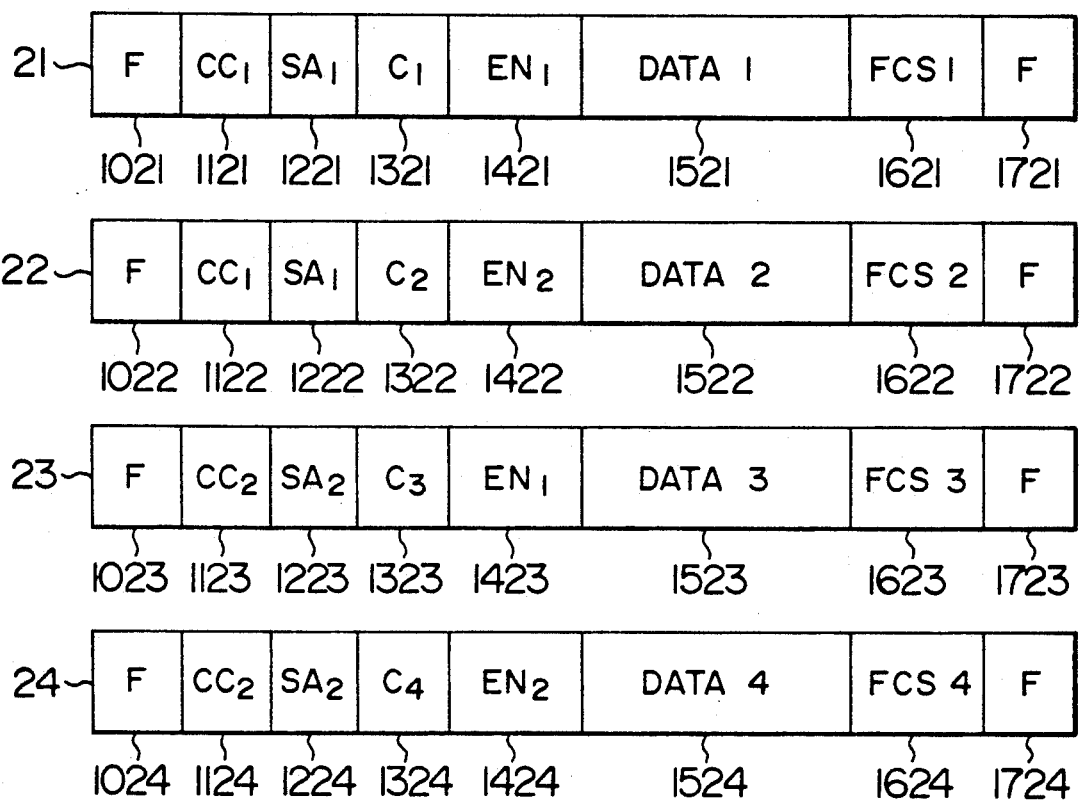

In this manner, the data of the multi-data input program is processed in accordance with the present invention. The overall flow thereof is explained with reference to FIGS. 1a and 1b. FIG. 1a shows system configuration and process flow. The system configuration is identical to that shown in FIG. 2. Application programs 402 and 403 have been loaded in the processors 102 and 104, and the processor 101 is connected to the external equipment 401. There is an I/O relation shown in FIG. 5 between the external equipment 401 and the application programs 402 and 403. It is assumed that the processor 101 has read two data items consecutively from the external equipment. The processor 101 sets content codes $CC_1$ and $CC_2$ to the two data items read from the external equipment and sets event numbers $EN_1$ and $EN_2$ to the data items, respectively. It also prepares data messages 21 and 22 having a format shown in FIG. 1b and sends them to the transmission line 151. The message format follows the one shown in FIG. 3. The processors 102 and 104 read in the data 21 and 22. Assuming that the processor 102 first reads in the data 21, it starts the application program 402 of FIGS. 1a and 5 using the data 21. On the other hand, the processor 104 reads the data 21 and 22, but since all data necessary for starting the application program 408 has not been received, that data is stored in the buffer in its processing unit 304. The program 402 of the processor 102 sets the content code $CC_2$ and the event number $EN_1$ to the process result of the application program 402 on the data 1521 in data message 21 to prepare data message 23, and sends it to the network. Then, the application program 402 is started using the data in data message 22, and the content code $CC_2$ and the event number $EN_2$ are set to the process result to prepare data message 24, which is sent to the network. The processor 104 reads in the data message 23 and 24. It is assumed that the data message 24 is first read by the processor 104. The processor 104 compares the event numbers of the data 21 and 22 with the event number of the data 24. Since the data 22 and the data 24 have equal event number $EN_2$, the processor 104 starts the application program 403 by the data 22 and the data 24. The event number $EN_2$ is set to the process result. Similarly, the application program 104 is started by the data 21 and the data 23, and the event number $EN_1$ is set to the process result.

In accordance with the present invention, the execution of the multi-data input program is assumed by consistency by the event number between a plurality of data applied to the single program.

Alternatively, the processor which has received data from the external input equipment may add to the data an input time as a label, and when another processor reads in the data from the transmission line, it may correlate the data based on the time which is the content of the label.

When the processor reads the data from the transmission line, it may adds to the data a read time as a label, and may correlate the data based on the time which is the content of the label.

What is claimed is:

1. A method for determining whether to start processing a predetermined number of data sets by one of a plurality of programs in a distributed processing system having a plurality of processors interconnected through a common transmission line, comprising the steps of:
 (a) adding, in each processor, an initial label which indicates a source of data to a data set generated by said each processor, and sending said generated data set together with said initial label to the said common transmission line;
 (b) adding, in each processor which receives said generated data set and said initial label from said common transmission line, another label related to said initial label received with said generated data set to an output data set produced by executing a program for processing said generated data set and sending said output data set together with said another label to said common transmission line;
 (c) receiving, in each processor having a program or processing a predetermined number of data sets, said generated and output data sets and said initial and another labels from said common transmission lines; and (d) comparing, in said each processor having said program for processing a predetermined number of data sets, said initial and another labels received with said generated and output data sets by said each processor to each other and starting said program for processing a predetermined number of data sets when said comparison indicates that said initial and another labels are related to each other.

2. a method according to claim 1 wherein said labels indicated by said comparison to be related to each other are the same.

3. A method of determining whether to start processing a predetermined number of data by one of a plurality of programs in a distributed processing system having a plurality of processors connected through a common network and enhancing execution of said programs, comprising the steps of:

(a) adding, in each processor, an initial event number, which indicates a source of data to external data received from an external device in said each processor connected to the external device;

(b) sending, by said each processor, said external data together with said initial event number to the common network;

(c) adding, in each processor which receives said external data and said initial event number from the common network, another event number related to said initial event number included in said received external data to data produced by processing the received external data in said each processor which receives said external data and said initial event number, and sending said produced data together with said another event number to the common network;

(d) receiving, in each processor having a program for processing a predetermined number of data, said external and produced data and said initial and another event numbers from the common network;

(e) identifying, in said each processor having said program for processing a predetermined number of data, event numbers included in said external and produced data and said initial and another event numbers received from the common network that are related to each other; and (f) starting, in said each processor having said program for processing a predetermined number of data, said program for processing said predetermined number of data having event numbers identified as being related to each other.

4. A method of processing data according to claim 3 wherein each processor adds a label to data read from the common network indicating that said data was read from the common network.

5. A method of processing data according to claim 4 wherein the label added by each processor is time of data input.

6. A method of processing data according to claim 3, wherein each one of said plurality of processors receives data with an event number from the common network, generates an event number based on the event number in the received data, and adds the generated event number to output data which is produced as a result of processing the received data.

7. A method of processing data according to claim 3, wherein an event number in one of the plurality of received external and produced data necessary for starting the program are added to output data which is produced as a result of processing the received external and produced data by the programs in order to provide a set of event numbers having a content which reflects said initial and another labels included in the received external and produced data.

8. a method according to claim 3 wherein said event numbers unidentified as being related to each other have the same value.

* * * * *